(12) United States Patent
Sung

(10) Patent No.: US 11,475,648 B2
(45) Date of Patent: Oct. 18, 2022

(54) SYSTEM AND METHOD FOR PROVIDING EYEWEAR TRY-ON AND RECOMMENDATION SERVICES USING TRUEDEPTH CAMERA

(71) Applicant: COPTIQ CO., LTD., Seoul (KR)

(72) Inventor: Woo Seok Sung, Seoul (KR)

(73) Assignee: COPTIQ CO., LTD., Seoul (KR)

( * ) Notice: Subject to any disclaimer, the term of this patent is extended or adjusted under 35 U.S.C. 154(b) by 0 days.

(21) Appl. No.: 17/269,304

(22) PCT Filed: Aug. 7, 2019

(86) PCT No.: PCT/KR2019/009900
§ 371 (c)(1),
(2) Date: Feb. 18, 2021

(87) PCT Pub. No.: WO2020/045849
PCT Pub. Date: Mar. 5, 2020

(65) Prior Publication Data
US 2021/0217249 A1    Jul. 15, 2021

(30) Foreign Application Priority Data
Aug. 31, 2018   (KR) .................. 10-2018-0103335

(51) Int. Cl.
*G06T 19/00*   (2011.01)
*G06T 7/521*   (2017.01)
(Continued)

(52) U.S. Cl.
CPC .......... *G06T 19/006* (2013.01); *G06K 9/6201* (2013.01); *G06Q 30/0631* (2013.01);
(Continued)

(58) Field of Classification Search
None
See application file for complete search history.

(56) References Cited

U.S. PATENT DOCUMENTS 8,982,182 B2   3/2015  Shpunt et al.
9,996,981 B1   6/2018  Tran et al.
(Continued)

FOREIGN PATENT DOCUMENTS

KR   10-2004-0097200 A   11/2004
KR   10-2014-0053647 A    5/2014
(Continued)

OTHER PUBLICATIONS

David Cardinal, "How Apple's iPhone X TrueDepth Camera Works", Sep. 14, 2017, https://www.extremetech.com/mobile/255771-apple-iphone-x-truedepth-camera-works. (Year: 2017).*
(Continued)

*Primary Examiner* — Tize Ma
(74) *Attorney, Agent, or Firm* — Sughrue Mion, PLLC

(57) ABSTRACT

The present invention relates to technology for providing eyewear recommendation and try-on services to a customer and allowing the customer to select optimal eyewear based on the eyewear recommendation and try-on services. A system for providing eyewear try-on and recommendation services according to one embodiment may include a feature data extraction unit for extracting feature data from the face mesh of a customer created using a TrueDepth camera, an eyewear adjustment unit for performing rendering by adjusting the specifications of eyewear by reflecting the extracted feature data, a matching processing unit for matching the facial image of the customer and the face mesh, and a try-on processing unit for performing a try-on process by overlapping the rendered eyewear on the facial image of the customer in an augmented reality manner with reference to the face mesh in the matching state.

17 Claims, 8 Drawing Sheets

(51) Int. Cl.
  *G06T 17/20* (2006.01)
  *G06K 9/00* (2022.01)
  *G06K 9/46* (2006.01)
  *G06K 9/62* (2022.01)
  *G06Q 30/06* (2012.01)
  *G06V 10/40* (2022.01)
  *G06V 40/18* (2022.01)

(52) U.S. Cl.
  CPC ......... *G06Q 30/0643* (2013.01); *G06T 7/521* (2017.01); *G06T 17/20* (2013.01); *G06V 10/40* (2022.01); *G06V 40/193* (2022.01); *G06T 2207/10048* (2013.01); *G06T 2207/30201* (2013.01)

(56) References Cited

U.S. PATENT DOCUMENTS

| | | | |
|---|---|---|---|
| 11,157,985 B2 * | 10/2021 | Kornilov | .............. G06V 40/165 |
| 2005/0162419 A1 | 7/2005 | Kim et al. | |
| 2015/0055086 A1 * | 2/2015 | Fonte | .................. G02C 13/005 |
| | | | 700/98 |
| 2016/0299360 A1 * | 10/2016 | Fonte | .................... B29D 12/02 |
| 2017/0345183 A1 | 11/2017 | Chen | |
| 2019/0282324 A1 * | 9/2019 | Freeman | ........... A61M 16/0084 |

FOREIGN PATENT DOCUMENTS

| | | |
|---|---|---|
| KR | 10-2015-0052890 A | 5/2015 |
| KR | 10-2017-0010985 A | 2/2017 |
| WO | 2018/048902 A1 | 3/2018 |

OTHER PUBLICATIONS

NOA of KR Application No. 10-2018-0103335 dated Aug. 21, 2020.

International Search Report of PCT/KR2019/009900 dated Nov. 13, 2019 [PCT/ISA/210].

Extended European Search Report dated May 10, 2022 in European Application No. 19856196.1.

* cited by examiner

211

212

SYSTEM AND METHOD FOR PROVIDING EYEWEAR TRY-ON AND RECOMMENDATION SERVICES USING TRUEDEPTH CAMERA

CROSS REFERENCE TO RELATED APPLICATIONS

This application is a National Stage Entry of PCT International Application No. PCT/KR2019/009900, which was filed on Aug. 7, 2019, and which claims priority to Korean Patent Application No. 10-2018-0103335, filed on Aug. 31, 2018 in the Korean Intellectual Property Office, the disclosure of which is incorporated herein by reference.

TECHNICAL FIELD

The present invention relates to technology for utilizing a face mesh created by 3D scanning using a TrueDepth camera, and more particularly, to technology for providing eyewear recommendation and try-on services to a customer based on the created face mesh. The technology of the present invention may help a customer select optimal eyewear.

BACKGROUND ART

The Apple iPhone X works by radiating about 30,000 infrared dots onto the user's face, reading the coordinates of the radiated infrared dots using an infrared sensing camera, and creating a face mesh using the coordinates.

The face mesh created in this way can be used for various purposes. For example, a face mesh can be used for security purposes to identify a user registered based on the facial data thereof.

In particular, a face mesh has absolute information on the size and shape of a face, and thus can be used for various purposes. For example, when measuring the specific coordinates of a face and distances and angles between the coordinates, a face mesh can also be applied to technology for producing customized eyewear.

DISCLOSURE

Technical Problem

Therefore, the present invention has been made in view of the above problems, and it is one object of the present invention to provide 3D scanning, a try-on service, and a recommendation service to enable online shopping for eyewear.

It is another object of the present invention to produce and provide customized eyewear to increase customer satisfaction.

It is still another object of the present invention to provide a try-on service providing an accurate representation to a customer by utilizing face tracking technology using a face mesh.

It is still another object of the present invention to determine a face type by quantifying a facial image and provide a recommendation service based on the determined face type.

It is still another object of the present invention to increase the accuracy of 3D scanning by using a face mesh.

It is yet another object of the present invention to provide a recommendation service in consideration of a category classified by a face mesh, previous choices of a customer, and preferences of other customers to increase the accuracy of the recommendation service.

Technical Solution

In accordance with one aspect of the present invention, provided is a system for providing eyewear try-on and recommendation services, the system including a feature data extraction unit for extracting feature data from a face mesh of a customer created using a TrueDepth camera; an eyewear adjustment unit for performing rendering by adjusting specifications of eyewear by reflecting the extracted feature data; a matching processing unit for matching a facial image of the customer and the face mesh; and a try-on processing unit for performing a try-on process by overlapping the rendered eyewear on the facial image of the customer in an augmented reality manner with reference to the face mesh in the matching state.

The feature data extraction unit according to one embodiment may radiate 30,000 or more infrared rays onto a face of the customer, collect 30,000 or more infrared dots using the TrueDepth camera in response to the radiated infrared rays, and create a face mesh of the customer based on coordinates of the collected infrared dots.

The feature data extraction unit according to one embodiment may use specific coordinates measured from the face mesh, and may extract the feature data using at least one of distance, angle, and depth between the specific coordinates.

The feature data extraction unit according to one embodiment may extract feature data based on at least one of a distance between eyes, a distance between inner ends of eyes, a distance between outer ends of eyes, nose height, heights of glabella and eyes, face width, face length, inner folds of each ear, a temporal bone, a sphenoid bone, and a cheekbone arch measured from the face mesh.

The system for providing eyewear try-on and recommendation services according to one embodiment may further include a recommendation processing unit that recommends eyewear in consideration of the feature data of the customer.

The recommendation processing unit according to one embodiment may further reflect results previously selected by other customers in the feature data of the customer, and may recommend the eyewear to the customer.

The recommendation processing unit according to one embodiment may further reflect results selected in a previous step by the customer in the feature data of the customer, and may recommend the eyewear in a current step.

The recommendation processing unit according to one embodiment may reflect customer information about the customer in the feature data of the customer, and may recommend the eyewear.

The recommendation processing unit according to one embodiment may determine a category classified by the feature data of the customer, refer to a database in which a list of eyewear corresponding to each category is recorded, and recommend at least one eyewear in consideration of selection frequency among eyewear corresponding to the determined category.

The try-on processing unit according to one embodiment may perform a try-on process after transparent treatment of the reference face mesh.

The try-on processing unit according to one embodiment may control a recording medium to store the try-on-processed image, and may process the recorded image to be provided to a user terminal requested by the customer.

In accordance with another aspect of the present invention, provided is a method of operating a system for providing eyewear try-on and recommendation services using a TrueDepth camera, the method including a step of extracting feature data from a face mesh of a customer created using a TrueDepth camera; a step of performing rendering by adjusting specifications of eyewear by reflecting the extracted feature data; a step of matching a facial image of the customer and the face mesh; and a step of performing a try-on process by overlapping the rendered eyewear on the facial image of the customer in an augmented reality manner with reference to the face mesh in the matching state.

The step of extracting feature data according to one embodiment may include a step of radiating 30,000 or more infrared rays onto a face of the customer; a step of collecting 30,000 or more infrared dots using the TrueDepth camera in response to the radiated infrared rays; and a step of creating a face mesh of the customer based on coordinates of the collected infrared dots.

The step of extracting feature data according to one embodiment may include a step of extracting the feature data by using specific coordinates measured from the face mesh and at least one of distance, angle, and depth between the specific coordinates.

The method of operating a system for providing eyewear try-on and recommendation services according to one embodiment may further include a step of recommending eyewear in consideration of the feature data of the customer.

The step of recommending eyewear according to one embodiment may include a step of further reflecting results previously selected by other customers in the feature data of the customer and recommending the eyewear to the customer.

The step of recommending eyewear according to one embodiment may include a step of further reflecting results selected in a previous step by the customer in the feature data of the customer and recommending the eyewear in a current step.

The step of recommending eyewear according to one embodiment may include a step of reflecting customer information about the customer in the feature data of the customer and recommending the eyewear.

The step of recommending eyewear according to one embodiment may include a step of determining a category classified by the feature data of the customer; and a step of referring to a database in which a list of eyewear corresponding to each category is recorded and recommending at least one eyewear in consideration of selection frequency among eyewear corresponding to the determined category.

Advantageous Effects

According to one embodiment, by providing 3D scanning, a try-on service, and a recommendation service, online shopping for eyewear can be realized.

According to one embodiment, by producing and providing customized eyewear, customer satisfaction can be increased.

According to one embodiment, by utilizing face tracking technology using a face mesh, a try-on service providing an accurate representation can be provided to a customer.

According to one embodiment, a face type can be determined by quantifying a facial image, and a recommendation service can be provided based on the determined face type.

According to one embodiment, by using a face mesh, the accuracy of 3D scanning can be increased.

According to one embodiment, by providing a recommendation service in consideration of a category classified by a face mesh, previous choices of a customer, and preferences of other customers, the accuracy of the recommendation service can be increased.

BEST MODE

Figure 1:
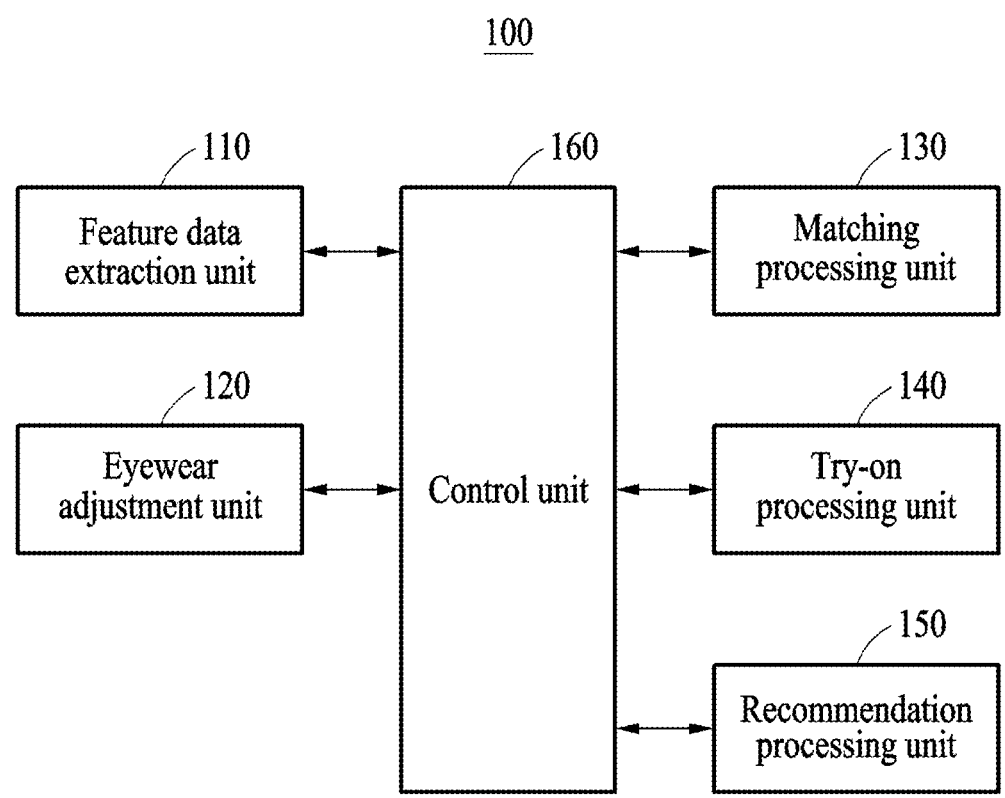
FIG. 1 is a block diagram for explaining a system for providing eyewear try-on and recommendation services according to one embodiment.

Specific structural and functional descriptions of embodiments according to the concept of the present invention disclosed herein are merely illustrative for the purpose of explaining the embodiments according to the concept of the present invention. Furthermore, the embodiments according to the concept of the present invention can be implemented in various forms and the present invention is not limited to the embodiments described herein.

The embodiments according to the concept of the present invention may be implemented in various forms as various modifications may be made. The embodiments will be described in detail herein with reference to the drawings. However, it should be understood that the present invention is not limited to the embodiments according to the concept of the present invention, but includes changes, equivalents, or alternatives falling within the spirit and scope of the present invention.

The terms such as "first" and "second" are used herein merely to describe a variety of constituent elements, but the constituent elements are not limited by the terms. The terms are used only for the purpose of distinguishing one constituent element from another constituent element. For example, a first element may be termed a second element and a second element may be termed a first element without departing from the teachings of the present invention.

It should be understood that when an element is referred to as being "connected to" or "coupled to" another element, the element may be directly connected or coupled to the other element or intervening elements may be present. In contrast, when an element is referred to as being "directly connected to" or "directly coupled to" another element, there are no intervening elements present. Other words used to describe the relationship between elements or layers should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings. However, the scope of the present invention is not limited by these embodiments. Like reference numerals in the drawings denote like elements.

FIG. 1 is a block diagram for explaining a system 100 for providing eyewear try-on and recommendation services according to one embodiment.

The system 100 for providing eyewear try-on and recommendation services according to one embodiment may provide 3D scanning, a try-on service, and a recommendation service to enable online shopping for eyewear. In addition, the system 100 may produce and provide customized eyewear to increase customer satisfaction.

To perform these functions, the system 100 for providing eyewear try-on and recommendation services may include a feature data extraction unit 110, an eyewear adjustment unit 120, a matching processing unit 130, and a try-on processing unit 140. In addition, the system 100 may further include a control unit 160 for overall control of the components.

The feature data extraction unit 110 according to one embodiment may extract feature data from the face mesh of a customer created using a TrueDepth camera.

The feature data may be interpreted as information calculated using distance, angle, and depth between specific coordinates in the face mesh. For example, the feature data may be feature data obtainable from the face mesh, such as a distance between the eyes.

That is, the feature data extraction unit 110 according to one embodiment may extract feature data using specific coordinates measured from the face mesh.

For example, feature data may be extracted using at least one of distance, angle, and depth between specific coordinates measured from a face mesh. More specifically, the feature data extraction unit 110 may extract feature data using a distance between the eyes, a distance between the inner ends of the eyes, a distance between the outer ends of the eyes, nose height, the heights of the glabella and the eyes, face width, face length, the inner folds of each ear, the temporal bone, the sphenoid bone, or a cheekbone arch measured from a face mesh.

The feature data extraction unit 110 may directly create a face mesh. For example, the feature data extraction unit 110 may radiate 30,000 or more infrared rays onto the face of a customer, and then may control a TrueDepth camera in response to the radiated infrared rays to collect 30,000 or more infrared dots. In addition, the feature data extraction unit 110 may create the face mesh of the customer based on the coordinates of the collected infrared dots.

The eyewear adjustment unit 120 according to one embodiment may perform rendering by adjusting the specifications of eyewear by reflecting extracted feature data.

For example, eyewear chosen by default cannot fit all customers. Thus, the eyewear adjustment unit 120 may adjust some of the specifications of eyewear chosen by default in consideration of the feature data of a customer extracted from a face mesh to match the eyewear to the customer. That is, for a customer with a high nose and a wide glabella, the eyewear adjustment unit 120 may adjust the eyewear to suit the customer.

The matching processing unit 130 according to one embodiment may match the facial image of a customer and a face mesh.

For example, the matching processing unit 130 may match a facial image and a face mesh by matching feature points extracted as the facial image of a customer and feature points as the face mesh.

As another example, the matching processing unit 130 may match feature points extracted as the facial image of a customer and the feature points of a face mesh through a point-to-line, point-to-face, line-to-line, line-to-face, face-to-line, or face-to-face matching method, instead of a point-to-point matching method. For example, a facial image and a face mesh may be matched by matching feature point data specified from the face mesh and the jaw line of the customer identified in the facial image of a customer.

The try-on processing unit 140 according to one embodiment may perform a try-on process by overlapping rendered eyewear on the facial image of a customer in an augmented reality manner with reference to a face mesh in a matching state.

In this process, the try-on processing unit 140 according to one embodiment may make the face mesh invisible or only part of the face mesh visible in an actual augmented reality by performing a try-on process after transparent treatment of the reference face mesh.

Specifically, as the customer's face moves in augmented reality, the try-on processing unit 140 according to one embodiment may position virtual eyewear 3D modeling rendering at a specific location (10 to 15 mm above the glabella) on a face mesh, so that the customer may see himself or herself trying on eyewear in augmented reality.

At this time, the face mesh may be made transparent so that the grid of the mesh may be invisible, thereby expressing natural try-on. When performing eyewear modeling, various colors may be applied to one design, and the shape of customized eyewear may be checked in advance.

The try-on processing unit 140 according to one embodiment may control a recording medium to store a try-on-processed image, and may process the recorded image to be provided to a user terminal requested by the customer. For example, a customer may ask for opinions by sending a try-on image to loved ones or family just before purchasing eyewear. In this process, when the customer inputs identification information of a user terminal, the try-on image may be transmitted to the corresponding user terminal. Although the present embodiment describes inputting the identification information of a terminal, information related to a user to whom a try-on image is to be transmitted, such as a phone number or an email address, may be used.

In addition, the system 100 for providing eyewear try-on and recommendation services according to one embodiment may further include a recommendation processing unit 150 for recommending eyewear in consideration of the feature data of a customer.

The recommendation processing unit 150 according to one embodiment may recommend eyewear to customers in various ways.

For example, the recommendation processing unit 150 may recommend eyewear to a current customer by reflecting the feature data of the customer and results previously selected by other customers. For this type of recommendation, there must be something in common between the current customer and the past customers involved in the recommendation. For example, the recommendation processing unit 150 may pre-investigate customer information such as hobbies, inclinations, regions, occupations, sexes, ages, religions, hairstyles, and favorite colors. In addition, the recommendation processing unit 150 may set categories based on customer information about customers and classify the customers into the set categories. If a customer who intends to use an eyewear try-on service falls under category A, at least one eyewear selected by other customers belonging to category A may be recommended to the customer.

For this function, the recommendation processing unit 150 may quantify scanned face mesh data and then categorize the same. A face mesh may be extracted in a certain arrangement, and specific coordinates on the face mesh may always be arranged at the same position in numerical arrangement. That is, since the positions of specific coordinates on face meshes between customers may be compared, comparability is very high. The recommendation processing unit 150 may categorize specific coordinates through statistical cluster analysis. In addition, the recommendation processing unit 150 may utilize classification to perform type analysis according to the size of the face, type analysis according to the shape and size of the nose, type analysis according to the shape and size of the eyes, and type analysis according to the distance between the eyes. Then, the recommendation processing unit 150 may group users according to a specific type and collect information on eyewear having the highest preference as big data. In addition, the recommendation processing unit 150 may recommend eyewear preferred by users having a specific type in the future using the collected big data.

As another example, the recommendation processing unit 150 may recommend eyewear in a current step by further reflecting results selected in a previous step by a customer in the feature data of the customer.

For example, for a try-on service, the recommendation processing unit 150 may use information selected in the previous step by a customer for eyewear recommendation. If a customer prefers eyewear having a streamlined frame when inference is performed based on information selected in the previous step by the customer, a streamlined frame may be considered for future recommendation.

The recommendation processing unit 150 according to one embodiment may determine a category classified as the feature data of a customer and recommend eyewear to the customer. For this function, the recommendation processing unit 150 may refer to a database in which a list of eyewear corresponding to each category is recorded, and may recommend at least one eyewear in consideration of selection frequency among eyewear corresponding to the determined category.

For example, customers with facial features such as similar face length and width, a wide forehead, and a rounded chin line may be grouped into a specific category based on the face meshes thereof.

As described above, the customers corresponding to the specific category have boyish looks, and thus the recommendation processing unit 150 may recommend eyewear without excessive volume so that both cheeks of the customer do not look plump. In addition, the recommendation processing unit 150 may recommend rectangular eyewear or cat's eye-type eyewear having a sharp line so that a round face may look slimmer.

For example, the recommendation processing unit 150 may categorize customers based on the face meshes thereof. Likewise, the recommendation processing unit 150 may refer to previous selections of other customers corresponding to a specific category and recommend various eyewear to a current customer.

That is, when the present invention is used, 3D scanning, a try-on service, and a recommendation service may be provided to enable online shopping for eyewear. In addition, customized eyewear may be produced and provided to increase customer satisfaction, and the accuracy of 3D scanning may be increased by using a face mesh. In addition, a recommendation service may be provided in consideration of a category classified by a face mesh, previous choices of a customer, and preferences of other customers to increase the accuracy of the recommendation service.

FIGS. 2A to 2D are diagrams illustrating an embodiment of eyewear try-on and recommendation services.

Figure 2A:
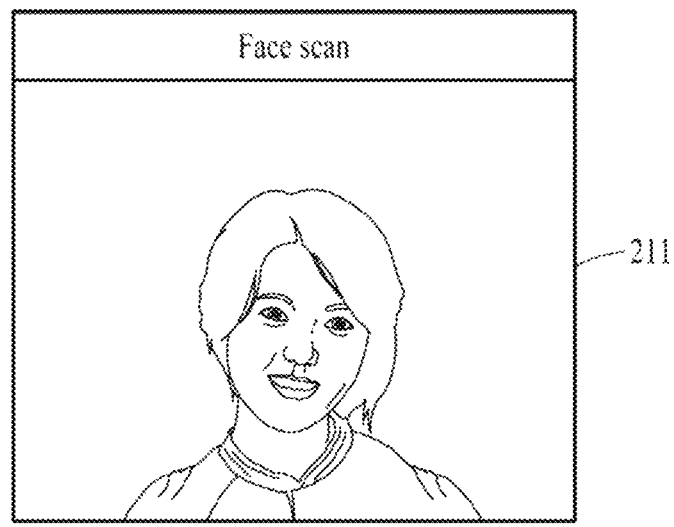
FIGS. 2A to 2D are diagrams illustrating an embodiment of eyewear try-on and recommendation services.
Figure 2A:
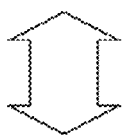
Figure 2A:
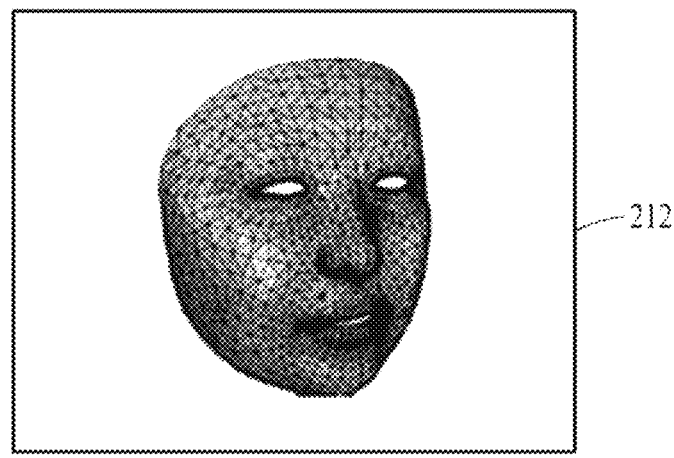

Referring to FIG. 2A, the system for providing eyewear try-on and recommendation services may radiate infrared rays onto the face of a customer to perform a face scan (211).

In this process, the system for providing eyewear try-on and recommendation services may radiate 30,000 or more infrared rays onto the face of a customer, and then may control a TrueDepth camera in response to the radiated infrared rays to collect 30,000 or more infrared dots. In addition, the system may create the face mesh of the customer based on the coordinates (x, y, z) of the collected infrared dots (212).

Figure 2B:
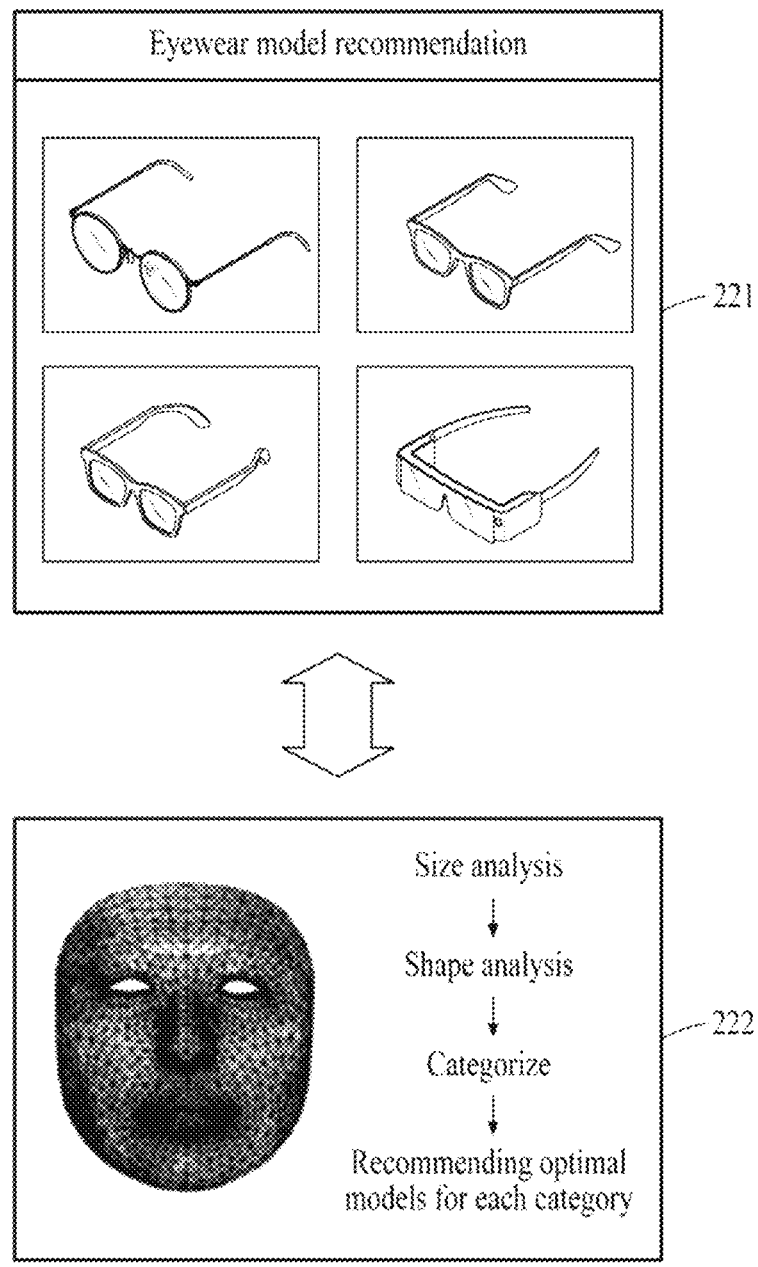

As shown in drawing symbol 221 of FIG. 2B, the system for providing eyewear try-on and recommendation services may recommend eyewear models that are expected to be preferred by a customer. In this case, the various methods described above may be used for eyewear model recommendation.

As shown in drawing symbol 222, the system for providing eyewear try-on and recommendation services may recommend eyewear models through various algorithms. The system for providing eyewear try-on and recommendation services may analyze the size and shape of a customer's face through a created face mesh. In this process, the face mesh of a customer may be classified into a specific category among several predefined categories. In addition, the system for providing eyewear try-on and recommendation services may recommend an optimal eyewear model for each classified category.

Figure 2C:
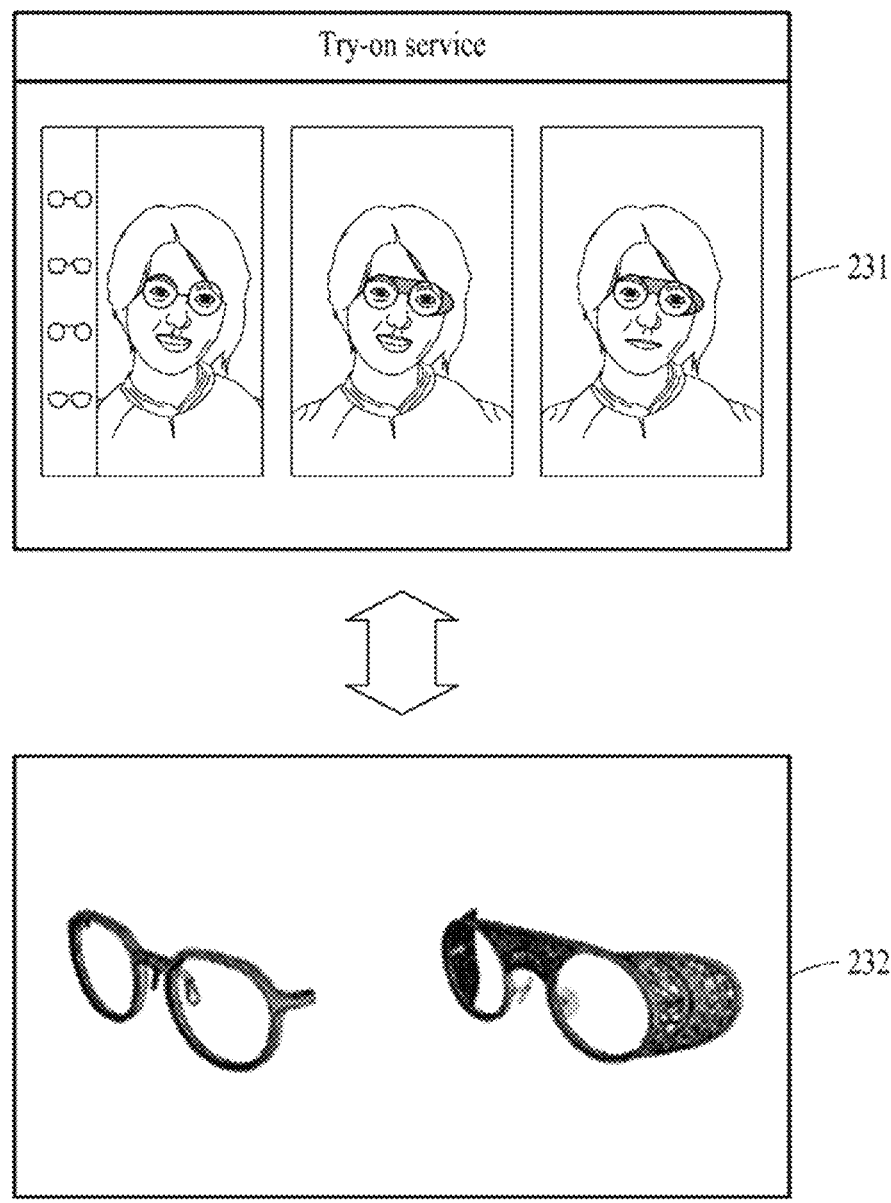
Figure 2D:
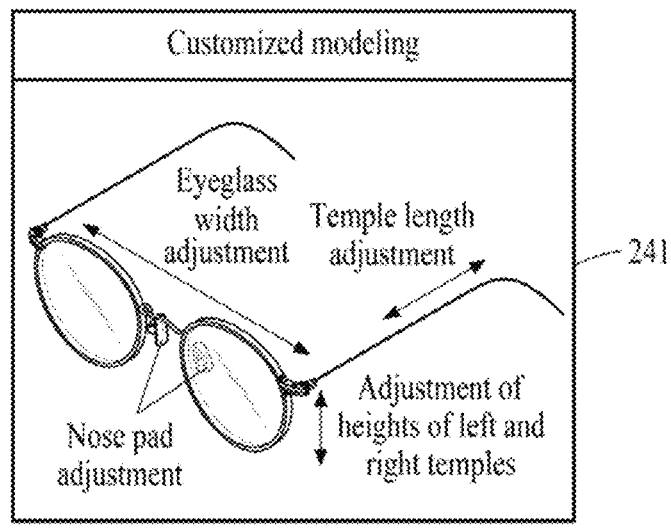
Figure 2D:
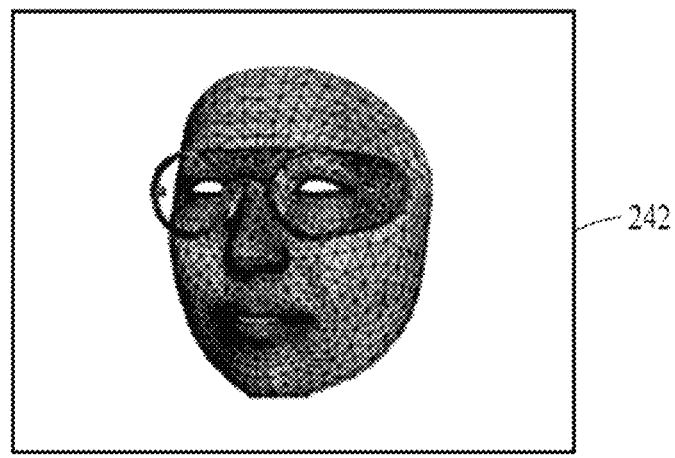

As shown in FIG. 2C, the system for providing eyewear try-on and recommendation services may provide a try-on service for eyewear (231). In addition, the system for providing eyewear try-on and recommendation services may transform the recommended eyewear model into various forms by reflecting customer needs (232).

Referring to FIG. 2C, the system for providing eyewear try-on and recommendation services may adjust the specifications of eyewear according to customer needs or the feature data of the customer (241). For example, the system for providing eyewear try-on and recommendation services may perform customized modeling by adjusting glasses width, nose pads, temple length, or temple height in a recommended eyewear model.

In addition, in a customized modeling process, the system for providing eyewear try-on and recommendation services may wear customized eyewear on a face mesh to check if the eyewear fits properly (242).

Figure 3:
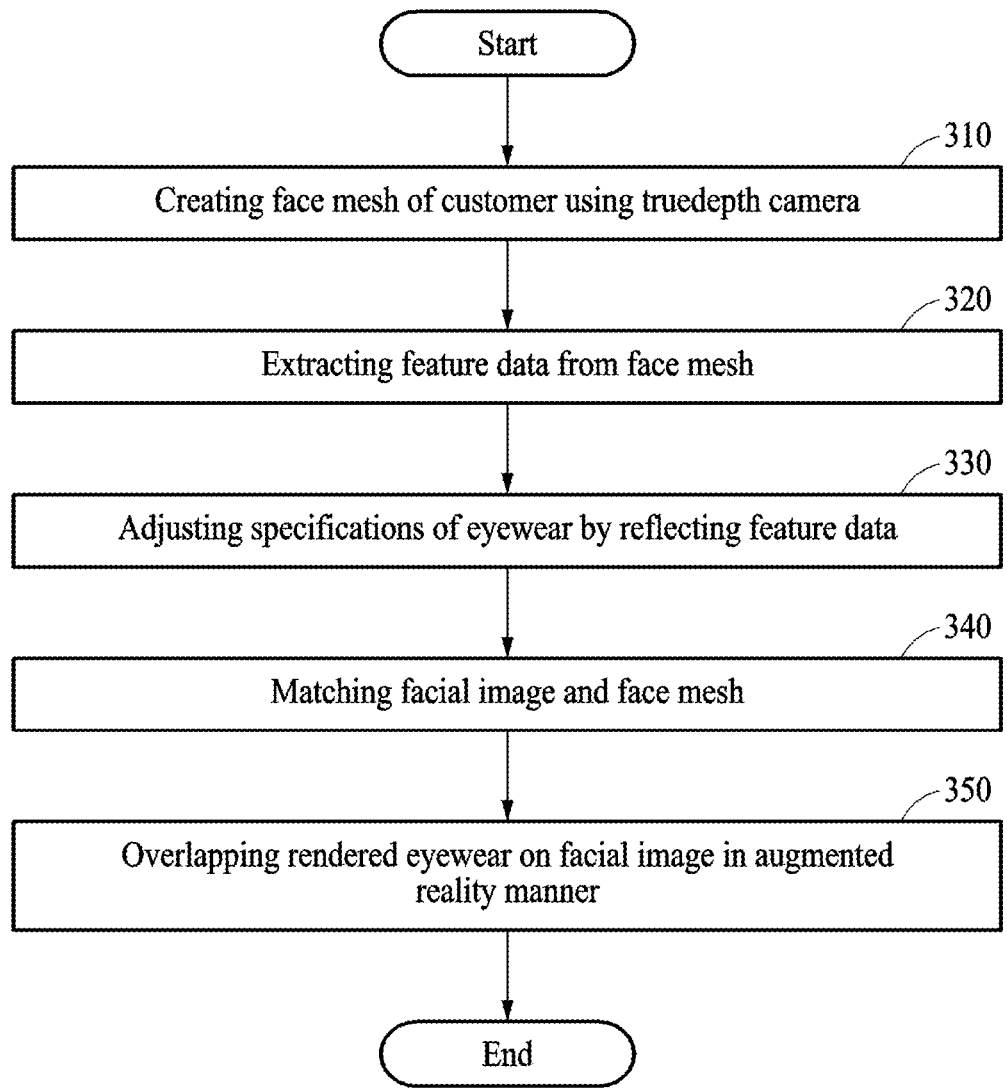
FIG. 3 is a flowchart for explaining a method of operating a system for providing eyewear try-on and recommendation services according to one embodiment.

FIG. 3 is a flowchart for explaining a method of operating a system for providing eyewear try-on and recommendation services according to one embodiment.

The method of operating a system for providing eyewear try-on and recommendation services according to one embodiment may include step 310 of creating the face mesh of a customer using a TrueDepth camera and step 320 of extracting feature data from the face mesh.

For example, according to the method of operating a system for providing eyewear try-on and recommendation services according to one embodiment, specific coordinates measured from a face mesh may be used to extract feature data. In this case, at least one of distance, angle, and depth between the specific coordinates may be used to extract feature data.

The method of operating a system for providing eyewear try-on and recommendation services according to one embodiment may include step 330 of adjusting the specifications of eyewear by reflecting feature data.

The method of operating a system for providing eyewear try-on and recommendation services according to one embodiment may include step 340 of matching the facial image of a customer and the face mesh, and step 350 of performing a try-on process by overlapping rendered eyewear on the facial image of the customer in an augmented reality manner with reference to the face mesh in the matching state.

Figure 4:
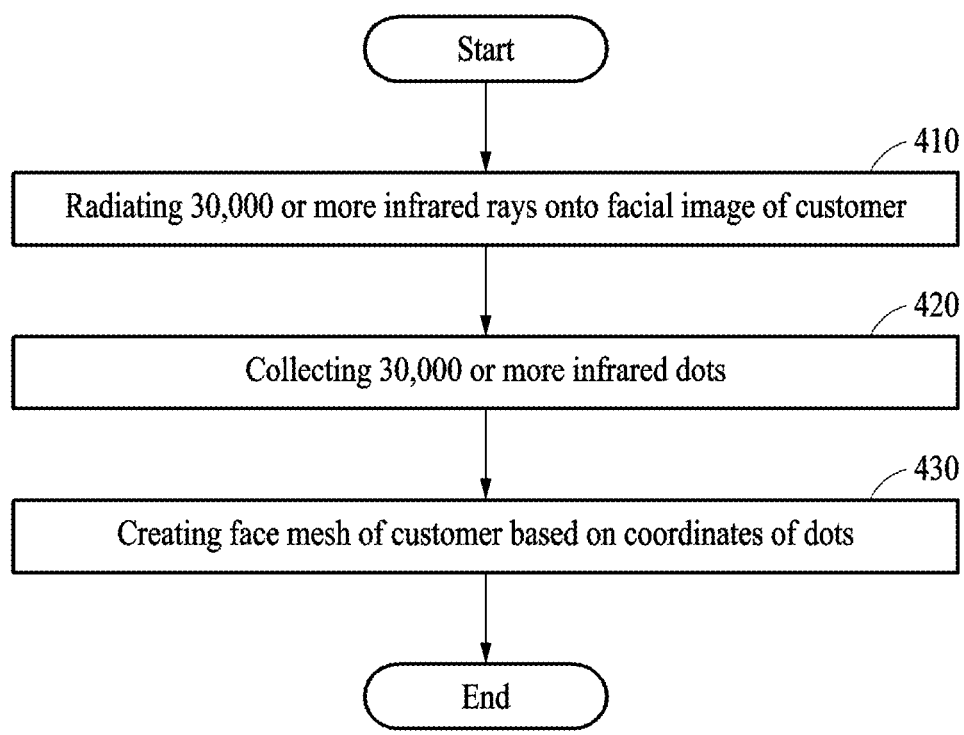
FIG. 4 is a flowchart for explaining a method of creating the face mesh of a customer.

FIG. 4 is a flowchart for explaining a method of creating the face mesh of a customer.

The method of operating a system for providing eyewear try-on and recommendation services according to one embodiment may include step 410 of radiating 30,000 or more infrared rays onto the face of the customer to create a face mesh.

In addition, the method may include step 420 of collecting 30,000 or more infrared dots using a TrueDepth camera in response to the radiated infrared rays.

In addition, the method of operating a system for providing eyewear try-on and recommendation services according to one embodiment may include step 430 of creating the face mesh of the customer based on the coordinates of the collected infrared dots.

Feature data extracted from the created face mesh may be used in various ways for eyewear recommendation.

Figure 5:
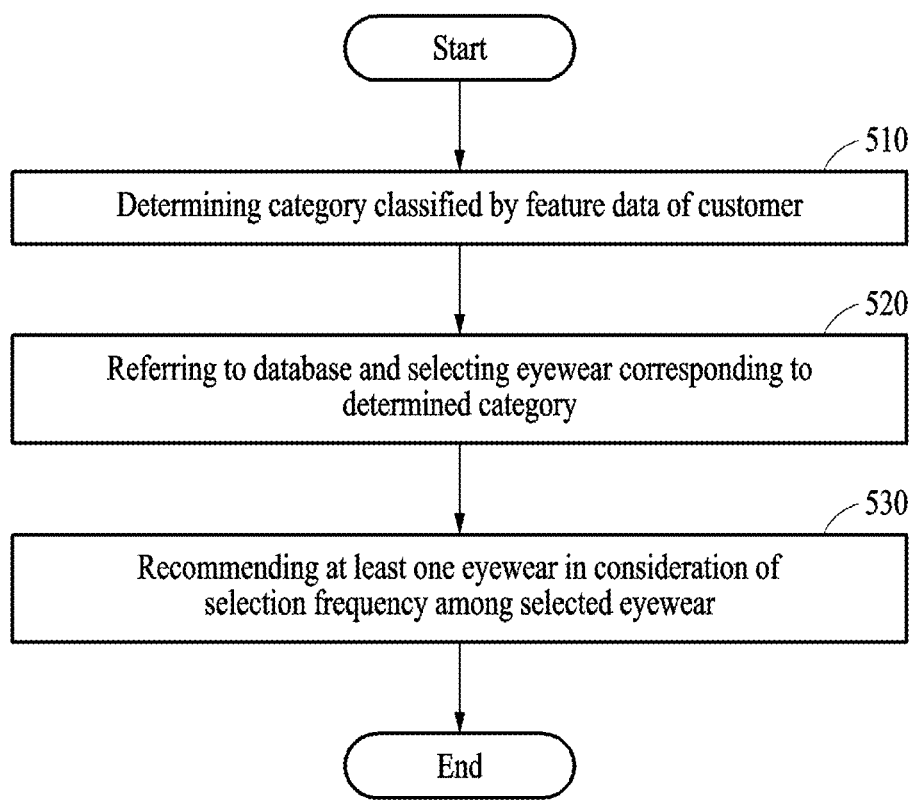
FIG. 5 is a flowchart for explaining a method of recommending eyewear based on a category classified by a face mesh.

FIG. 5 is a flowchart for explaining a method of recommending eyewear based on a category classified by a face mesh.

The method of operating a system for providing eyewear try-on and recommendation services according to one embodiment may include step 510 of determining a category classified by the feature data of the customer.

In addition, the method of operating a system for providing eyewear try-on and recommendation services according to one embodiment may include step 520 of selecting eyewear corresponding to the determined category with reference to a database, and step 530 of recommending at least one eyewear in consideration of selection frequency among the selected eyewear.

As another method for recommending eyewear, eyewear may be recommended to a customer by further reflecting results previously selected by other customers in the feature data of the customer. In addition, by further reflecting results selected in the previous step by a customer in the feature data of the customer, eyewear may be recommended in the current step. In addition, by reflecting customer information about a customer in the feature data of the customer, eyewear may be recommended.

Thereafter, information on eyewear that has been recommended and modified to meet customer needs may be used as information for 3D printing.

In addition, a database may be constructed based on the needs reflected in eyewear recommended to a current customer. Consequently, the accuracy of the system may be improved as the number of uses by customers increases.

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave.

The software may be distributed over a networked computer system and stored or executed in a distributed manner. The software and data may be stored in one or more computer-readable recording media.

The methods according to the embodiments of the present invention may be implemented in the form of a program command that can be executed through various computer means and recorded in a computer-readable medium. The computer-readable medium can store program commands, data files, data structures or combinations thereof. The program commands recorded in the medium may be specially designed and configured for the present invention or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

The invention claimed is:

1. A system for providing eyewear try-on and recommendation services using a TrueDepth camera, the system comprising:
   a feature data extraction unit for extracting feature data from a face mesh of a customer created using a TrueDepth camera;

an eyewear adjustment unit for performing rendering by adjusting specifications of eyewear by reflecting the extracted feature data;

a matching processing unit for matching a facial image of the customer and the face mesh; and a try-on processing unit for performing a try-on process by overlapping the rendered eyewear on the facial image of the customer in an augmented reality manner with reference to the face mesh in the matching state, wherein the feature data extraction unit radiates 30,000 or more infrared rays onto a face of the customer, collects 30,000 or more infrared dots using the TrueDepth camera in response to the radiated infrared rays, and creates the face mesh of the customer based on coordinates of the collected infrared dots, and wherein the matching processing unit matches feature points extracted as the facial image of the customer and the feature points of the face mesh through a point-to-line matching method, a point-to-face matching method, a line-to-line matching method, a line-to-face matching method, a face-to-line matching method, or a face-to-face matching method, instead of a point-to-point matching method.

2. The system according to claim 1, wherein the feature data extraction unit uses specific coordinates measured from the face mesh, and extracts the feature data using at least one of distance, angle, and depth between the specific coordinates.

3. The system according to claim 1, wherein the feature data extraction unit extracts feature data based on at least one of a distance between eyes, a distance between inner ends of eyes, a distance between outer ends of eyes, nose height, heights of glabella and eyes, face width, face length, inner folds of each ear, a temporal bone, a sphenoid bone, and a cheekbone arch measured from the face mesh.

4. The system according to claim 1, further comprising a recommendation processing unit that recommends eyewear in consideration of the feature data of the customer.

5. The system according to claim 4, wherein the recommendation processing unit further reflects results previously selected by other customers in the feature data of the customer, and recommends the eyewear to the customer.

6. The system according to claim 4, wherein the recommendation processing unit further reflects results selected in a previous step by the customer in the feature data of the customer, and recommends the eyewear in a current step.

7. The system according to claim 4, wherein the recommendation processing unit reflects customer information about the customer in the feature data of the customer, and recommends the eyewear.

8. The system according to claim 4, wherein the recommendation processing unit determines a category classified by the feature data of the customer, refers to a database in which a list of eyewear corresponding to each category is recorded, and recommends at least one eyewear in consideration of selection frequency among eyewear corresponding to the determined category.

9. The system according to claim 1, wherein the try-on processing unit performs a try-on process after transparent treatment of the reference face mesh.

10. The system according to claim 1, wherein the try-on processing unit controls a recording medium to store the try-on-processed image, and processes the recorded image to be provided to a user terminal requested by the customer.

11. A method of operating a system for providing eyewear try-on and recommendation services using a TrueDepth camera, the method comprising:

a step of extracting feature data from a face mesh of a customer created using a TrueDepth camera;

a step of performing rendering by adjusting specifications of eyewear by reflecting the extracted feature data;

a step of matching a facial image of the customer and the face mesh; and a step of performing a try-on process by overlapping the rendered eyewear on the facial image of the customer in an augmented reality manner with reference to the face mesh in the matching state, wherein the step of extracting feature data comprises a step of radiating 30,000 or more infrared rays onto a face of the customer;

a step of collecting 30,000 or more infrared dots using the TrueDepth camera in response to the radiated infrared rays; and a step of creating the face mesh of the customer based on coordinates of the collected infrared dots, and wherein the step of matching the facial image of the customer and the face mesh comprises matching feature points extracted as the facial image of the customer and the feature points of the face mesh through a point-to-line matching method, a point-to-face matching method, a line-to-line matching method, a line-to-face matching method, a face-to-line matching method, or a face-to-face matching method, instead of a point-to-point matching method.

12. The method according to claim 11, wherein the step of extracting feature data comprises a step of extracting the feature data by using specific coordinates measured from the face mesh and at least one of distance, angle, and depth between the specific coordinates.

13. The method according to claim 11, further comprising a step of recommending eyewear in consideration of the feature data of the customer.

14. The method according to claim 13, wherein the step of recommending eyewear comprises a step of further reflecting results previously selected by other customers in the feature data of the customer and recommending the eyewear to the customer.

15. The method according to claim 13, wherein the step of recommending eyewear comprises a step of further reflecting results selected in a previous step by the customer in the feature data of the customer and recommending the eyewear in a current step.

16. The method according to claim 13, wherein the step of recommending eyewear comprises a step of reflecting customer information about the customer in the feature data of the customer and recommending the eyewear.

17. The method according to claim 13, wherein the step of recommending eyewear comprises a step of determining a category classified by the feature data of the customer; and a step of referring to a database in which a list of eyewear corresponding to each category is recorded and recommending at least one eyewear in consideration of selection frequency among eyewear corresponding to the determined category.

* * * * *